United States Patent Office 3,471,352
Patented Oct. 7, 1969

3,471,352
MANUFACTURE OF SHEET MATERIAL
Thomas Andrew Brooke, Prescott, and Peter Michael Robinson, Widnes, England, assignors to Dunlop Rubber Company Limited, London, England, a British company
No Drawing. Filed Nov. 30, 1965, Ser. No. 510,695
Claims priority, application Great Britain, Dec. 9, 1964, 50,027/64
Int. Cl. B29d 19/00; B29h 7/22
U.S. Cl. 156—272
2 Claims

ABSTRACT OF THE DISCLOSURE

A method for use in the manufacture of mechanical belting of curing a rubber or rubber-like composition, in which the temperature of the composition is first raised to a temperature below curing temperature by subjecting the composition to micro-wave energy at a frequency of at least 1,000 megacycles per second, and the temperature of the composition then raised to curing temperature during consolidation of the belting between heated surfaces in a press.

---

This invention relates to the manufacture of sheet material, e.g. conveyor and transmission belting.

A method of vulcanising conveyor and transmission belting comprises heating the belting in a press while under pressure. This may be carried out by two methods:

(a) Flat moulding press

This is the most commonly used method. A section of the belt to be vulcanised is placed between two flat metal surfaces which are heated by means of steam, hot water or electricity to sufficient temperature to vulcanise the rubber. During the heating, the section of belt between the metal platens is consolidated by pressure on these platens.

Depending on the thickness of the belt to be vulcanised, the length of time each section of belt is heated in the press can vary from 12 minutes to 60 minutes.

(b) Continuous press

An alternative method of vulcanising belting is to pass the belt through a continuous press so that the belt is heated and consolidated by pressure continuously instead of using a section-by-section method.

The normal operating speed of such a continuous press is between 1 and 4 ft./minute, depending on the thickness of the belt to be vulcanised.

It is an object of the present invention to reduce the vulcanisation time required in either a section-by-section method, or a continuous method.

According to the invention a method of manufacturing sheet material from thermoplastic or thermosetting material comprises internally heating the sheet or a portion thereof by the application thereto of energy at microwave frequency, and further heating the said sheet or portion thereof by the application of heat by surface conduction.

Preferably the sheet or portion thereof is preheated by micro-wave energy, and subsequently heated by surface conduction. The method may be continuous where a length of sheet material is treated by the method according to the invention, the sheet being passed first through a micro-wave field and then into contact with and past a heated surface or surfaces. Alternatively, the method may be discontinuous where the sheet, or portion thereof is firstly heated in a micro-wave field while stationary, and then the sheet or portion thereof is moved into contact with a heated surface or surfaces for further heating by surface conduction.

In this specification "micro-wave" is used to denote a frequency of greater than 1,000 megacycles per second (mc./s.). In a preferred form of the invention the frequency used lies in the range 1,000 mc./s. to 5,000 mc./s.

The invention also includes sheet material heated by the method referred to in the preceding two paragraphs.

In the method according to the invention, the inside of the belt is raised by the micro-wave heating stage to a higher temperature, in a given time, than the outside of the belt. On the other hand, in the press moulding stage of the operation, the outside of the belt is heated more rapidly than the inside of the belt. The two methods of heating are combined to give (a) a more even distribution of heat, and thereby more even vulcanisation, and (b) a lower time of vulcanisation than is possible by either method alone.

In one embodiment of the invention, by way of example, a belt is internally pre-heated by micro-wave heating at a frequency of 2450 mc./s. to a temperature of 60–100° C., and the heating is continued by conduction in either a flat press or a continuous press to raise the temperature of the belt to the final vulcanising temperature (normally 135–160° C.). Where a continuous press is used, the pre-heating can be carried out on a continuous basis and where a flat press is used one press length can be pre-heated before being drawn into the press.

This process of pre-heating can be applied to cord reinforced or unreinforced belts made of natural rubber or synthetic rubbers such as styrene butadiene, polyisoprene, polybutadiene or polychloroprene and can also be applied to plastic materials such as polyvinyl chloride, (P.V.C.).

A further application of this method of heating is in the pre-gelling of P.V.C. coated fabric. In the manufacture of P.V.C. covered conveyor belting, the fabric is spread with, or dipped in P.V.C. paste. The fabric coated with wet paste is then heated to pre-gell the P.V.C. in order to provide a dry material which can be handled. Micro-wave heating at a frequency of 2450 mc./s. is used to carry out this pre-gelling of the P.V.C. This method of heating has an unexpected advantage compared with normal methods of indirect heating such as by infra-red rays. This advantage is of importance when using fabrics which consist of, or contain a percentage of synthetic fibres such as nylon, Terylene (registered trademark) or polypropylene (fabrics of this type are commonly used in the manufacture of P.V.C. covered conveyor belting). This advantage is that the P.V.C. is heated sufficiently to pre-gell it with negligible heating of the synthetic fibre. As the fibre shrinks under heating causing reduction in fabric width with the possibility of distortion in the fabric, it is desirable not to heat the synthetic fibre at this stage of the processing.

With dielectric heating in the micro-wave frequency range the fabric of the belting is not heated dielectrically. The only way in which the fabric may be heated is by conduction and since the period of dielectric heating is short the amount of heat conducted to the fabric is negligible.

After pre-gelling of the P.V.C. the belting material is fully vulcanised in either a flat moulding press or a continuous press.

Having now described our invention, what we claim is:
1. In the manufacture of mechanical belting comprising a rubber or synthetic rubber or resin composition, the curing of the said composition by an improved method which includes the step of raising the temperature of the composition by subjecting the composition to micro-wave energy at a frequency of at least one thousand megacycles per second, and applying pressure to the belting, the improvement residing in the steps of:

(a) raising the temperature of the composition by means of the micro-wave energy to a temperature below curing temperature; and
(b) subsequently raising the temperature of the said composition to curing temperature while compressing the belting between heated surfaces in a press.

2. A method according to claim 1 wherein the frequency of the micro-wave energy is between 1,000 and 5,000 megacycles per second.

References Cited

UNITED STATES PATENTS

| | | | |
|---|---|---|---|
| 2,388,824 | 11/1945 | Brown | 264—26 |
| 2,495,170 | 1/1950 | Kinn | 219—10.41 |
| 2,739,351 | 3/1956 | Henning | 18—53 |
| 2,280,771 | 4/1942 | Dufour et al. | 117—93.1 |
| 2,545,370 | 3/1951 | Mittelmann | 156—273 |
| 2,865,790 | 12/1958 | Baer | 117—93.1 |
| 3,190,998 | 6/1965 | Dyke | 264—26 |

DOUGLAS J. DRUMMOND, Primary Examiner

U.S. Cl. X.R.

204—159.14, 159.20; 264—25